United States Patent
Hulburt et al.

(10) Patent No.: US 6,337,446 B1
(45) Date of Patent: Jan. 8, 2002

(54) COLLAPSIBLE SCALE

(75) Inventors: Joan Hulburt, 2043 Random Rd., Cleveland, OH (US) 44106; Brian B. Mathewson, Rocky River, OH (US)

(73) Assignee: Joan Hulburt, Cleveland, OH (US)

( * ) Notice: Subject to any disclaimer, the term of this patent is extended or adjusted under 35 U.S.C. 154(b) by 0 days.

(21) Appl. No.: 09/563,717

(22) Filed: May 3, 2000

(51) Int. Cl.[7] .................. G01G 21/00; G01G 21/28
(52) U.S. Cl. ........................... 177/126; 177/127
(58) Field of Search .................... 177/126, 127, 177/128

(56) References Cited

U.S. PATENT DOCUMENTS

| | | | | |
|---|---|---|---|---|
| 2,869,855 A | * | 1/1959 | Murphy | 177/126 |
| 3,043,386 A | * | 7/1962 | Marion et al. | 177/126 |
| 3,272,269 A | * | 9/1966 | Murphy | 177/126 |
| 3,444,942 A | * | 5/1969 | Murphy | 177/126 |
| 3,985,191 A | | 10/1976 | Wellman | 177/208 |
| 4,043,413 A | | 8/1977 | Schaenen | 177/126 |
| 4,085,810 A | | 4/1978 | Wellman | 177/209 |
| 4,431,072 A | * | 2/1984 | Stepp | 177/126 |
| D274,991 S | | 8/1984 | Wirtz | D10/92 |
| 4,537,266 A | | 8/1985 | Greenberg | 177/208 |
| 4,542,547 A | | 9/1985 | Sato | 5/453 |
| 4,711,313 A | | 12/1987 | Iida et al. | 177/127 |
| 4,765,421 A | | 8/1988 | Newton et al. | 177/199 |
| 4,782,905 A | | 11/1988 | Lam | 177/208 |
| D304,308 S | | 10/1989 | Morooka | D10/92 |
| 5,065,830 A | * | 11/1991 | Stevenson | 177/126 |
| 5,129,472 A | | 7/1992 | Du et al. | 177/208 |
| 5,234,065 A | | 8/1993 | Schmidt | 177/209 |
| 5,393,935 A | * | 2/1995 | Hasty et al. | 177/126 |
| 5,414,225 A | | 5/1995 | Garfinkle | 177/199 |
| 5,446,248 A | * | 8/1995 | Strasser | 177/134 |
| 5,955,705 A | * | 9/1999 | Germanton | 177/126 |

FOREIGN PATENT DOCUMENTS

DE    00-3140483 A1 *  4/1983  ............. 177/126

* cited by examiner

*Primary Examiner*—Randy W. Gibson
(74) *Attorney, Agent, or Firm*—Fay, Sharpe, Fagan, Minnich & McKee, LLP

(57) ABSTRACT

A collapsible weighing scale that reduces to the smallest possible size for maximum portability and convenience includes a platform having a plurality of interconnected support segments and a supporting structure connected to the platform. In one embodiment, a thin top platform is made from a plurality of connected segments and supported by two beams. These beams support the segments, transfer the load to the ground, and incorporate sensors to measure the weight. The platform segments collapse into a more compact shape while the support beams fold into place parallel to the segments, resulting in a significant reduction in the overall volume taken up by the fully deployed unit. In another embodiment, the platform and the support segments can be expanded in a fan-like arrangement. In still another embodiment, the several platform segments can unfold from a compact configuration and form the support structure in doing so.

20 Claims, 15 Drawing Sheets

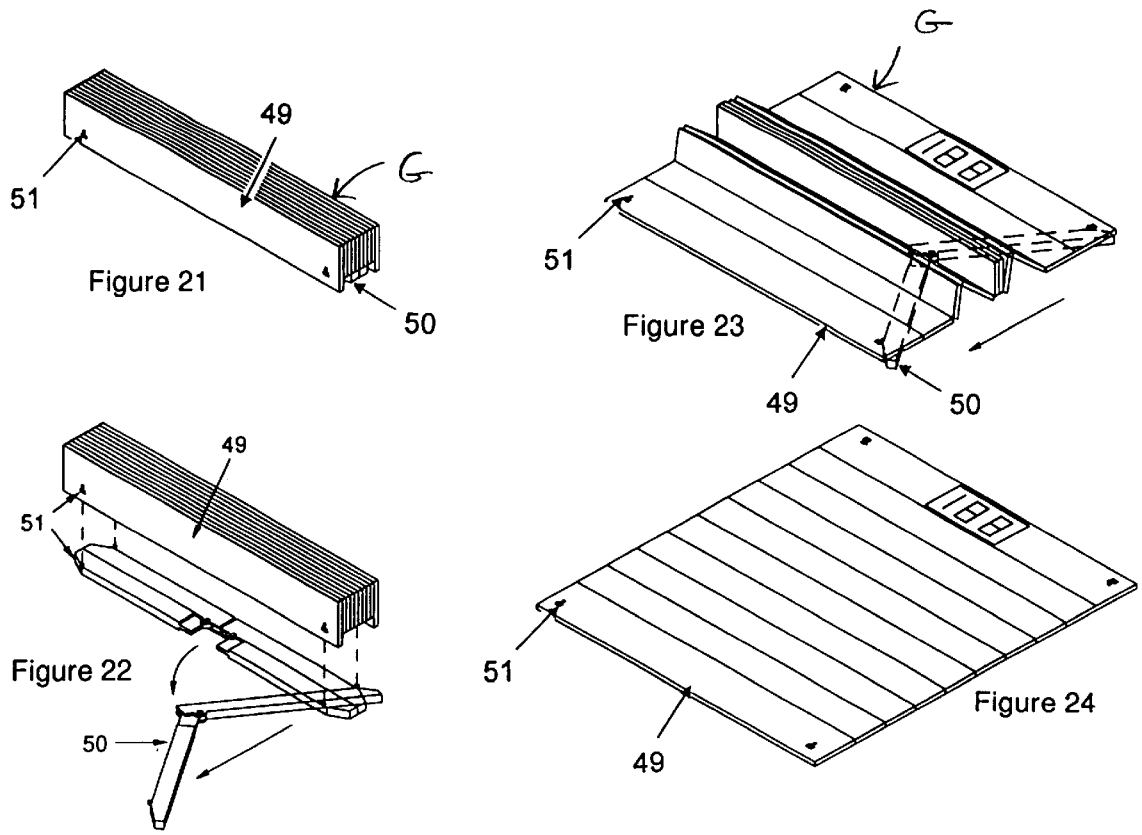
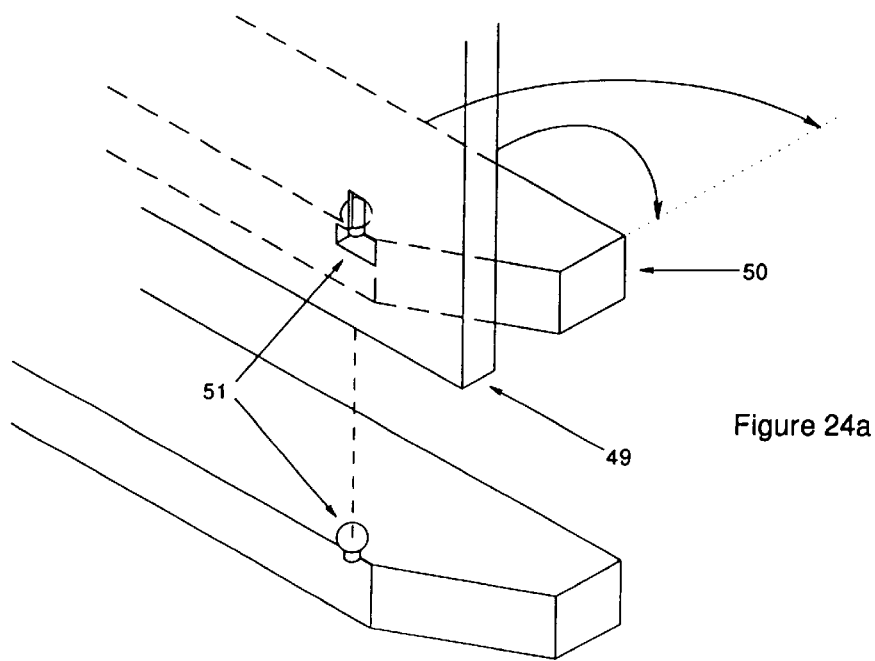

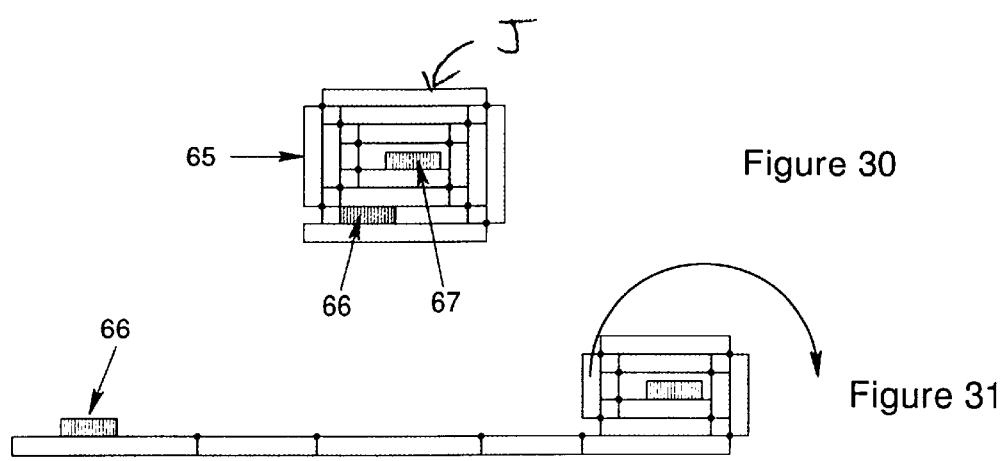
Figure 30
Figure 31
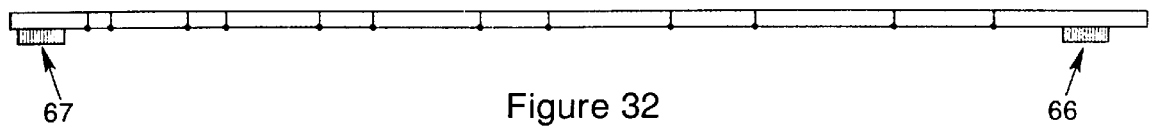
Figure 32

COLLAPSIBLE SCALE

BACKGROUND OF THE INVENTION

The present invention relates to portable weighing scales that collapse from a deployed configuration into a compact form.

While a number of prior approaches have suggested designs for folding scales, these folded-up configurations generally trade width for height. This provides no intrinsic advantage over a comparably sized non-folding scale when packed into baggage.

One known folding scale, disclosed in U.S. Pat. No. 5,234,065 by Schmidt, uses an incompressible fluid to transmit pressure information to pressure sensors. While the design can be folded up into one quarter of its original area, the effective thickness of the unit quadruples, giving up none of its volume.

U.S. Pat. No. 4,537,266 to Greenberg suggests rolling a scale up into a cylinder shape. However, here too the form changes but the volume required in the compacted configuration does not. U.S. Pat. Nos. 274,991 to Wirtz, 4,711,313 to Iida et. al., 4,765,421 to Newton et. al., 5,414,225 to Garfinkle, and Des. 304,308 to Morooka all relate to folding scales, more specifically scales that fold in two. Again, none of the designs demonstrate a substantial reduction in volume in the folded-up configuration. Since the majority of the space inside weighing scales is in fact empty, the compaction of the essential elements of the device into a minimal form would be advantageous.

U.S. Pat. No. 4,043,413 to Schaenen provides for the disassembly of two rigid plates that comprise the base and weighing platform, normally spaced apart during use by a central weight measuring column. While this design affords a reduction in overall volume when the plates are collapsed together, it requires two strong, thick, rigid plates that cannot be folded into a more compact form, making the scale relatively large, even in its collapsed form. It is also heavy and therefore less desirable for portability.

It has therefore been considered desirable to develop a new and improved portable weighing scale that not only collapses into a more compact form, but also occupies a substantially reduced volume when compared to the deployed configuration, thereby overcoming the foregoing shortcomings and meeting the above-stated needs and others.

SUMMARY OF THE INVENTION

In accordance with one embodiment of the present invention, a collapsible weighing scale is provided.

More particularly in accordance with this aspect of the present invention, the collapsible weighing scale comprises a platform comprised of a plurality of interconnected support segments which are arranged such that the support segments can be alternately collapsed into a storage configuration and deployed into a use configuration in which said plurality of support segments lie side to side in a common plane. A supporting structure is connected to the platform wherein the platform, when fully deployed, rests on the supporting structure and wherein the supporting structure can be collapsed. A load sensing apparatus is attached to the supporting structure wherein the load sensing apparatus senses the full weight of an associated object which is placed on the fully deployed platform supported by the fully deployed supporting structure. A display, that converts the weight sensed by the load sensing apparatus to a human readable form, is connected to said load sensing apparatus.

The most likely use for this device is as a portable, personal scale for measuring one's body weight while traveling or at a workout. Another likely application pertains whenever insufficient space exists for storing a conventional scale on the floor. In this case, the device can readily be deployed and used whenever required. In a related application, the scale remains at floor level in its collapsed form and can be triggered through a simple mechanism to deploy while on the floor. After use it can be closed back up in a similar manner. For these applications the scale typically would have a maximum capacity of about 300 pounds. In yet another application, the scale can be reduced in size and specialized for use in a kitchen, laboratory, or an industrial environment. For example, a kitchen scale could be substantially smaller than conventional weighing scales and would be especially useful where storage and counter space is limited.

One advantage of the present invention is the provision of a weighing scale that can be collapsed into a more compact form than known scales.

Another advantage of the present invention is the provision of a collapsible weighing scale having a platform with a plurality of interconnected support segments and a supporting structure having beams for supporting the platform. The platform support segments can be collapsed into a storage configuration or deployed into a use configuration. Similarly, the supporting structure beams can be collapsed into a storage configuration and deployed into a use configuration.

Still another advantage of the present invention is the provision of a collapsible weighing scale having a latching mechanism to fix a last platform segment to an end support member in order to ensure that the platform and its supports remain in place during use.

Yet another advantage of the present invention is the provision of a collapsible weighing scale with an end stop to prevent support members of the scale from pivoting too far or the wrong way when being retracted or extended.

Still yet another advantage of the present invention is the provision of a collapsible weighing scale with at least one securing device to keep support segments of a platform of the scale and support members of the scale secured together during transport.

An additional advantage of the present invention is the provision of a collapsible weighing scale with a platform and a support structure employing at least two beams. Each beam can be moved from a storage configuration to a use configuration. In various embodiments, the beams pivot, fold or telescope between the storage and use configurations.

A further advantage of the present invention is the provision of a collapsible weighing scale having platform segments and support members wherein the platform segments and support members are linked in such a way that deployment occurs in a single smooth motion.

A still further advantage of the present invention is the provision of a collapsible weighing scale employing sensors such as load cells, strain gauges and balance beams.

Yet another advantage of the present invention is the provision of an actuator to automatically deploy and/or retract the unit to facilitate ease of use and make it convenient to store the unit up against a wall on a support surface.

Still further advantages of the present invention will become apparent to those of ordinary skill in the art upon a reading and understanding of the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments of the invention and are not to be construed as limiting the invention.

FIG. 21 is a perspective view of a scale in a fully collapsed position having platform segments and support members linked so that deployment occurs in a single smooth motion according to a seventh embodiment of the present invention;

FIG. 22 is an exploded perspective view of the scale of FIG. 21 with one support beam partially deployed;

FIG. 23 is a perspective view of the scale of FIG. 21 shown in a partially deployed position;

FIG. 24 is a perspective view of the scale of FIG. 21 shown in a fully deployed position;

FIG. 24a is a greatly enlarged schematic exploded perspective view of a ball-and-socket joint of the scale of FIG. 21;

FIG. 30 is a schematic side elevational view, in a compacted configuration, of a tenth embodiment of the present invention wherein the support segments are hinged in such a way that they only fold in one direction and are sized such that they can be folded around each other as illustrated;

FIG. 31 is a schematic side elevational view of the scale of FIG. 30 in a partially unfolded condition;

FIG. 32 is a schematic side elevational view of the scale of FIG. 30 in a fully unfolded, use configuration;

DETAILED DESCRIPTION OF THE PREFERRED EMBODIMENTS

Figure 1:
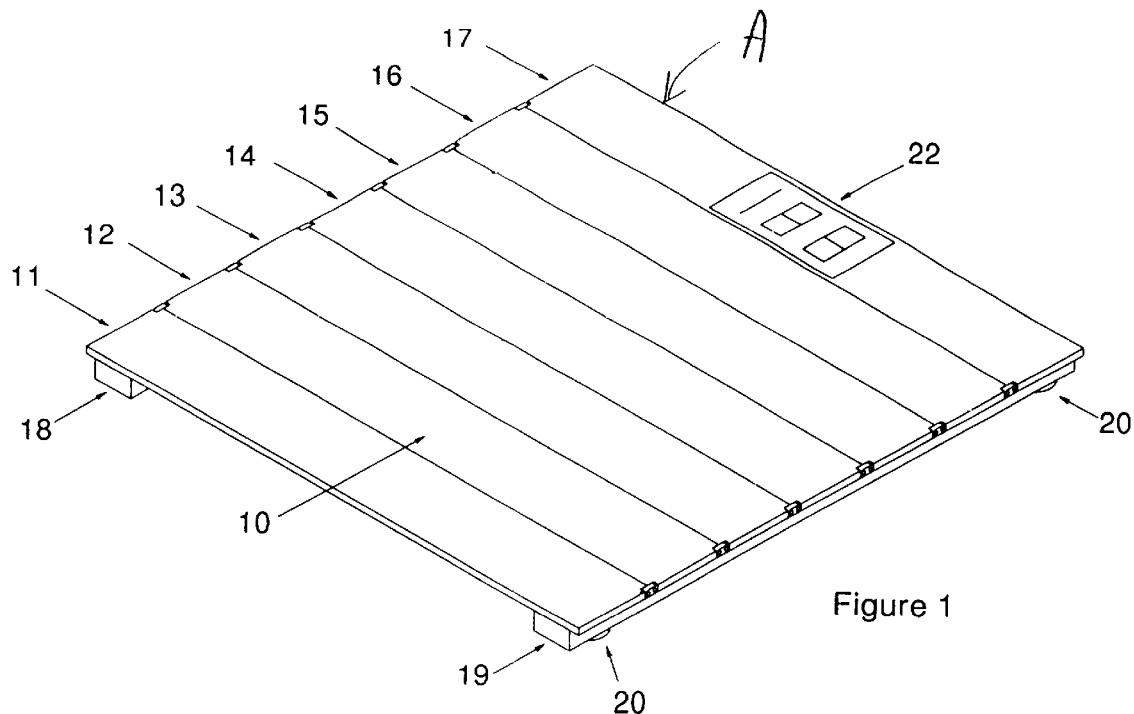
FIG. 1 is a perspective view of a collapsible weighing scale according to a first embodiment of the present invention.
Figure 2:
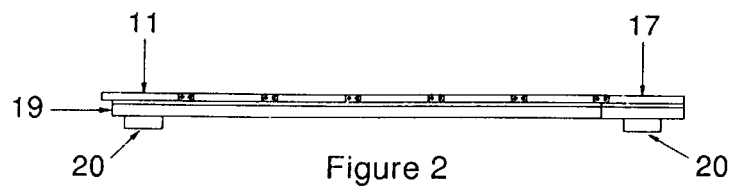
FIG. 2 is a side elevational view of the scale shown in FIG. 1.
Figure 2A:
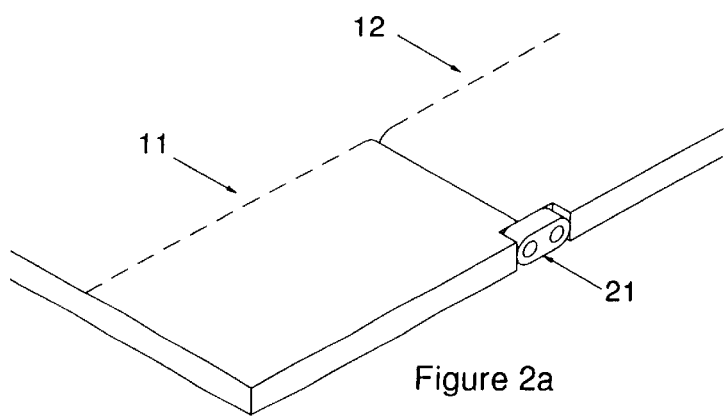
FIG. 2a is a greatly enlarged perspective view of a portion of FIG. 1 showing a hinge detail of the scale of FIG. 1.

Referring now to the drawings, wherein the showings are for purposes of illustrating preferred embodiments of the invention only and not for purposes of limiting same, FIG. 1 shows a collapsible platform scale A according to a first embodiment of the present invention in its fully deployed, operable configuration. A platform 10 of the scale A is made up of a plurality of individual platform support segments 11–17 (shown here with seven, but not limited to seven) hinged together and supported in the crosswise direction by two support members or beams 18 and 19. FIG. 2a illustrates hinge links 21 for securing the several segments 11–17 to each other. Each support beam incorporates sensing apparatus 20 as shown in FIG. 2 to measure the amount of weight it bears. The signals from each of the sensors are read and combined by the electronics and displayed on a digital numeric display 22 shown in FIG. 1.

Figure 3:
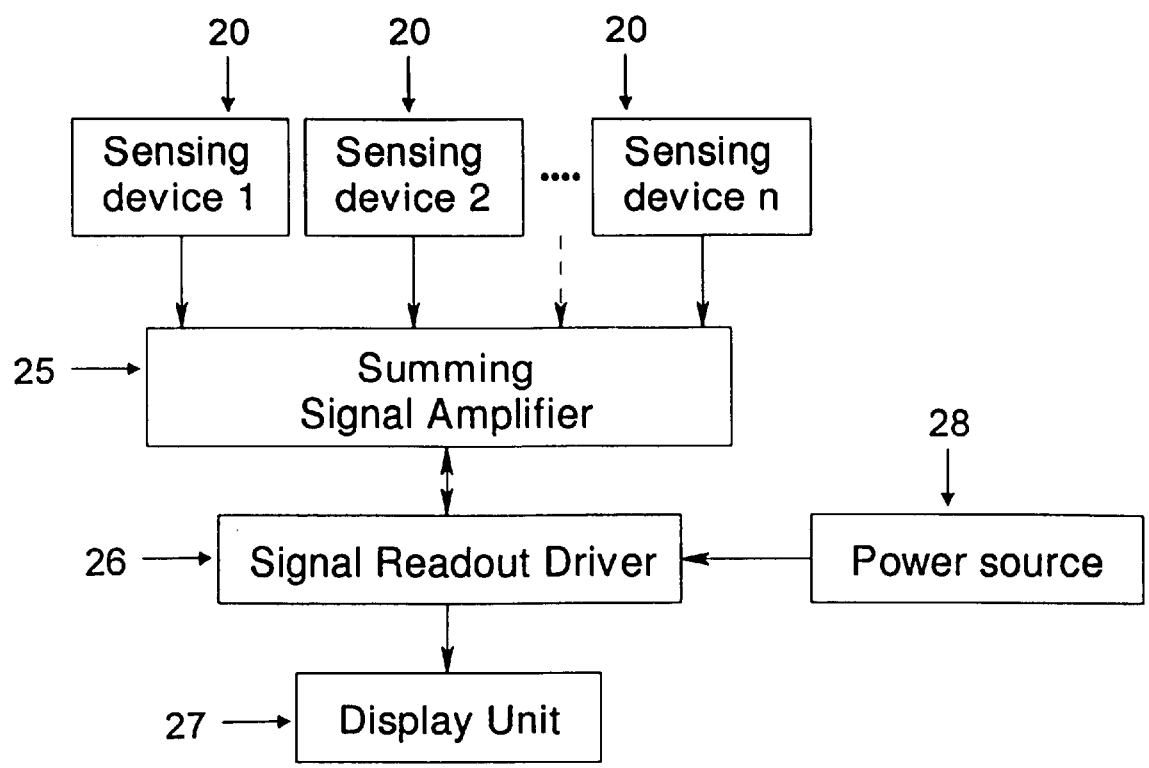
FIG. 3 is a diagram of the electronic circuitry to measure, process, and display a weight measurement as used in the scale of FIG. 1.
Figure 4:
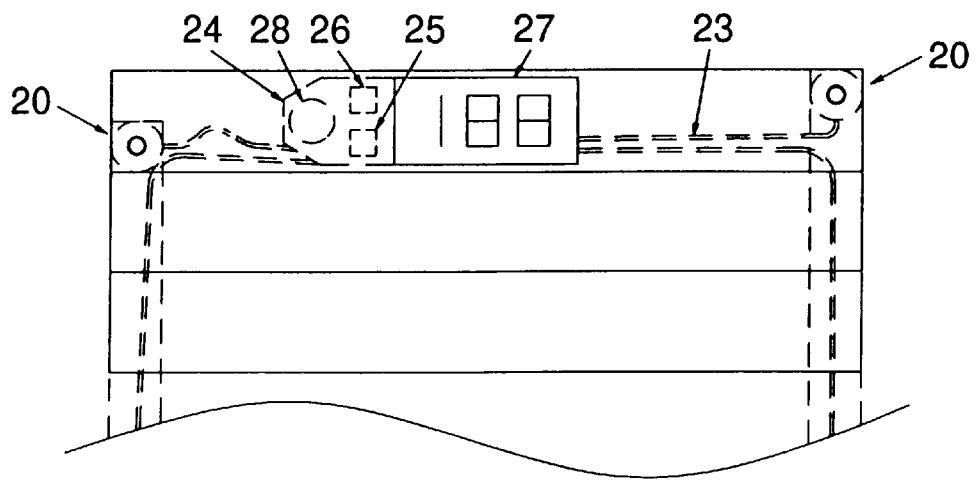
FIG. 4 is a schematic view of an upper portion of the scale of FIG. 1 showing the layout of the components and wiring corresponding to the diagram in FIG. 3.

The electronic circuitry to measure, process, and display the weight reading is similar in design to those used in conventional electronic scales that use load cells. The functioning of this circuitry is illustrated by means of example in FIG. 3, and one possible layout of the components and wiring is shown in FIG. 4. Known sensing devices 20, of which there are at least two, connect by means of flexible wires 23 into a conventional circuit board 24. These signals are fed into a known summing signal amplifier integrated circuit 25 that amplifies and combines the signals. Several known additional support components, not shown in FIG. 4, may also be required depending upon the level of integration of the single-chip device 25. This then outputs a signal proportional to the sensed weight into signal readout driver 26.

Signal readout driver 26 reads the weight signal using a known integrated analog-to-digital converter. For a maximum capacity of 300 pounds (136 kg) with one-half pound (0.2 kg) accuracy, the converter should have at least 10 bits of resolution. The signal readout driver then uses averaging to provide a stable reading, formats the converted load reading, and drives numeric display 27. This display can be based on LCD (liquid crystal display), LED (light emitting diode), or other appropriate known technology. The power source for the device can be an external power supply or a battery, such as the lithium battery 28 depicted in FIG. 4. The unit can use one of several different ways well understood by a person skilled in such designs of turning on when a load is sensed, and automatically switching off after a certain amount of time to conserve battery power. Thus the scale of FIG. 1 also includes a small battery or A/C adapter plug, a means of activating or turning on and off the unit, and a switch to display either pounds or kilograms.

Figure 5:
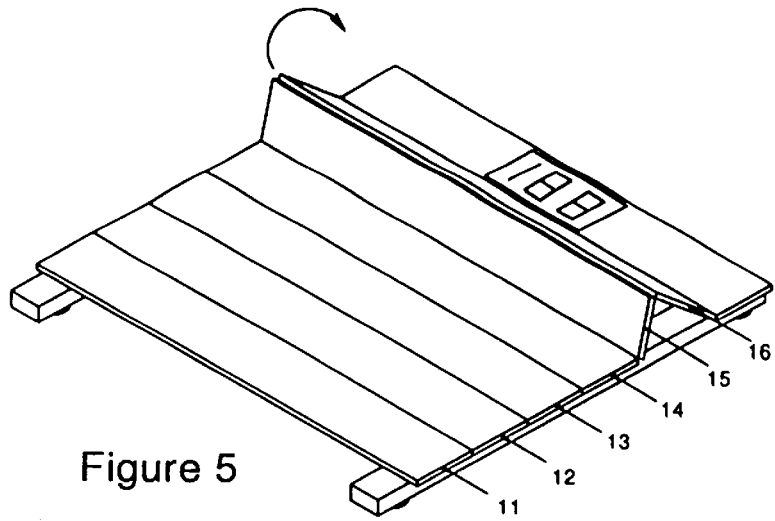
FIG. 5 shows the scale of FIG. 1 in a first step of being collapsed.
Figure 6:
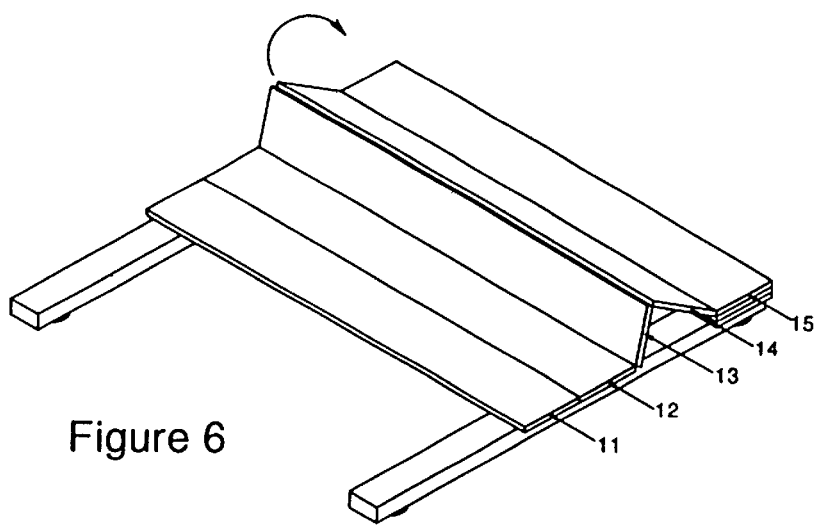
FIG. 6 shows the scale of FIG. 1 in a second step of being collapsed.
Figure 7:
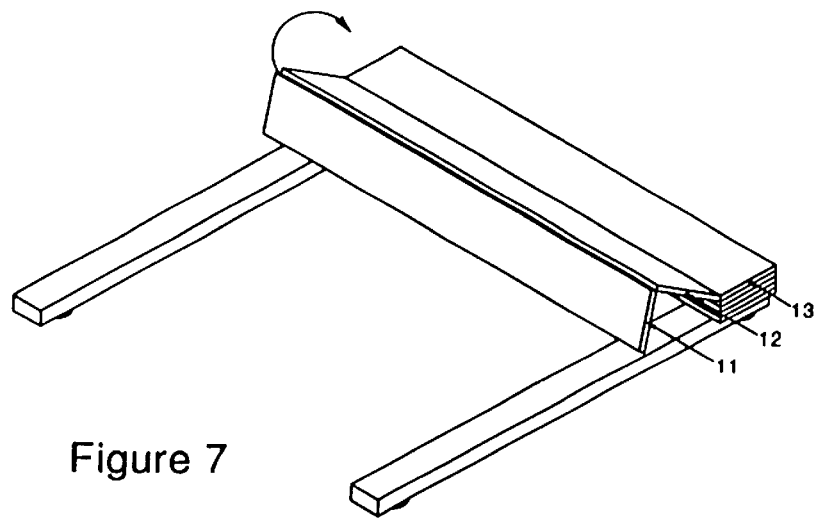
FIG. 7 shows the scale of FIG. 1 in a third step of being collapsed.
Figure 8:
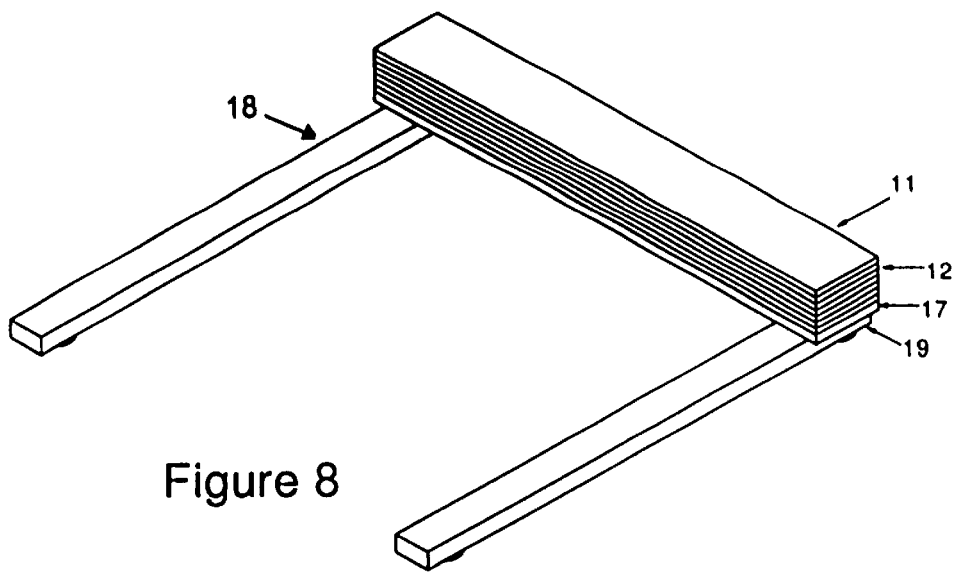
FIG. 8 shows the scale of FIG. 1 in a fourth step of being collapsed.
Figure 9:
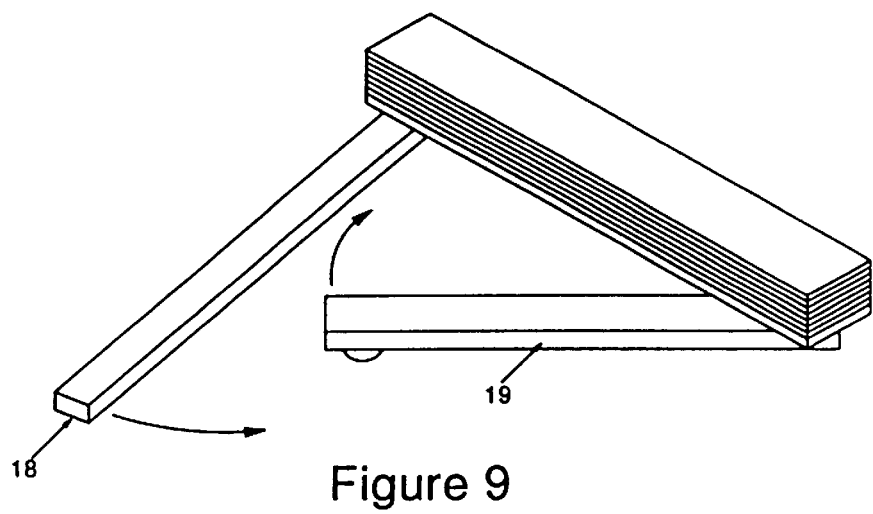
FIG. 9 shows the scale of FIG. 1 in a fifth step of being collapsed.
Figure 10:
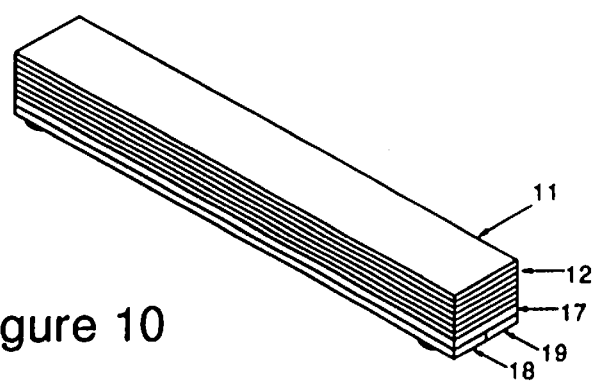
FIG. 10 shows the scale of FIG. 1 in a fully collapsed position.

The scale A collapses into a more compact form as shown in FIGS. 5 through 10. The segments 11–16 are alternately folded together, as shown in FIGS. 5, 6 and 7 into a compact stack onto the base segment 17 of the platform 10 as in FIG. 8. Then the support members 18 and 19, which are attached via pivots to the underside of the base segment 17, are folded away underneath the unit as shown in FIG. 9. The scale is shown in its fully collapsed configuration in FIG. 10.

The number of individual segments making up the platform, their composition and shape, and the type of mechanism used to link them together will vary according to the design requirements. One important design consideration concerns making sure the segments will not break nor permanently deform under maximum loading. For example, it needs to be recognized that the full load may initially fall on a single segment before settling in over a more distributed area. Some bending of the segments is expected given the separation of the underlying supports. However, the segments must be designed to be stiff enough to minimize downward bowing in the center. This deflection could make it difficult to keep steady on the scale, or it may interfere with the weight reading if the segments contact the floor. How much bending is acceptable depends on the design requirements and expected usage.

The segments 11–17 can be fashioned from metal, plastic, wood, composites, and other materials familiar to designers. They can incorporate corrugations, fins, bends, and other features in order to increase their relative stiffness. Linkages to tie them together but permit relative movement may include hinges, such as the hinges 21 shown in FIG. 2a, but could also include flexible straps, and other connecting mechanisms. Selection of the number, type, shape, and design of the segments 11–17 is left to the designer to optimize for cost, size, compactness, aesthetics, and portability. However, it is a general object of this invention that the segments number greater than two. The support members 18 and 19 can similarly be made of a conventional sturdy, yet lightweight, material. In a preferred embodiment the support members would be made from aluminum and feature a box-like cross-sectional shape to make the support structure stiff and lightweight.

Figure 11:
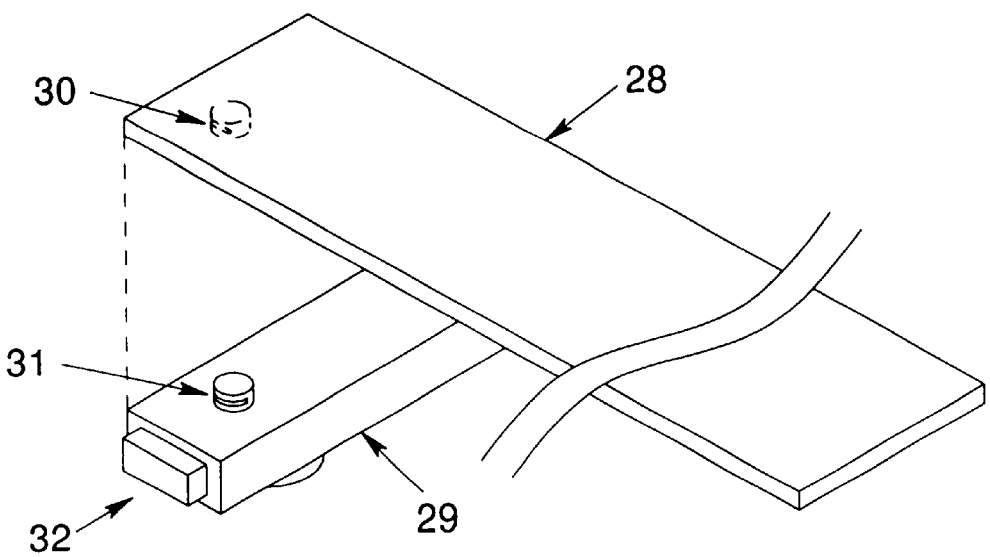
FIG. 11 is an exploded perspective view of a latch pin arrangement to fix a last platform segment to an end support member in order to ensure that the platform and its supports remain in place during use, which could be used with the scale of FIG. 1.

A further refinement to the design is the addition of a latching mechanism as shown in FIG. 11 to fix the last platform segment 11 to the distal end of support members 18 and 19 in order to ensure that the platform and its supports remain in place during use. One type of a latching mechanism that can be used to secure one segment 28 to a support member 29 is shown in FIG. 11. Receptacle 30, built into segment 28, snaps onto a latch pin 31 held on the support member 29. This receptacle includes a small flexible tab that mates with the groove on the latch pin to retain it vertically. A latch release button 32 retracts the pin, disengaging it from the segment 28, after which the scale can be closed up. Two latch pin receptacles, exactly like 30, can also be installed into a base segment of the unit to latch the support members into their retracted positions.

Figure 12:
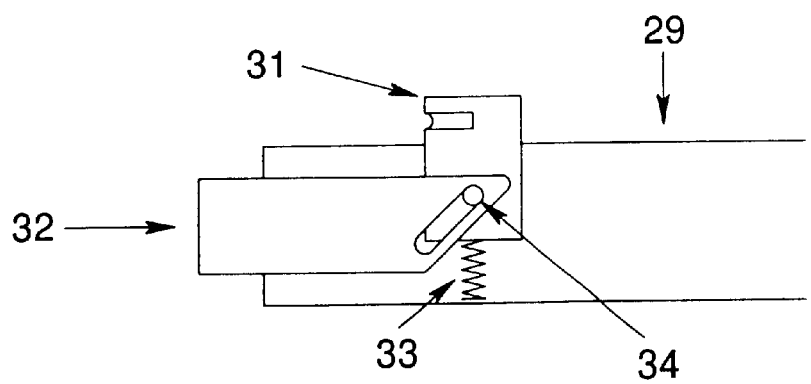
FIG. 12 is a cross sectional view of the latch pin arrangement of FIG. 11 with the latch pin in its engaged position.
Figure 13:
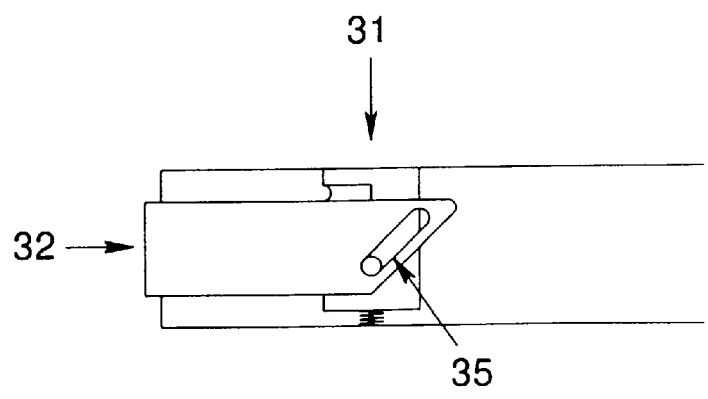
FIG. 13 is a cross sectional view of the latch pin arrangement of FIG. 11 with the latch pin in its retracted position.

The operation of the latch of FIG. 11 is shown in cross-section in FIGS. 12 and 13. In FIG. 12, the latch pin 31 is shown in its normal protruding state. A compression spring 33 holds the latch pin in this extended position. When latch release button 32 is depressed, the button moves to the right, engaging a pin 34 in a guide slot 35 that pushes down the latch pin into the state shown in FIG. 13. When released, the button 32 will return to the state shown in FIG. 12 due to the action of the spring coupling with the pin in the button's guide slot.

Figure 14:
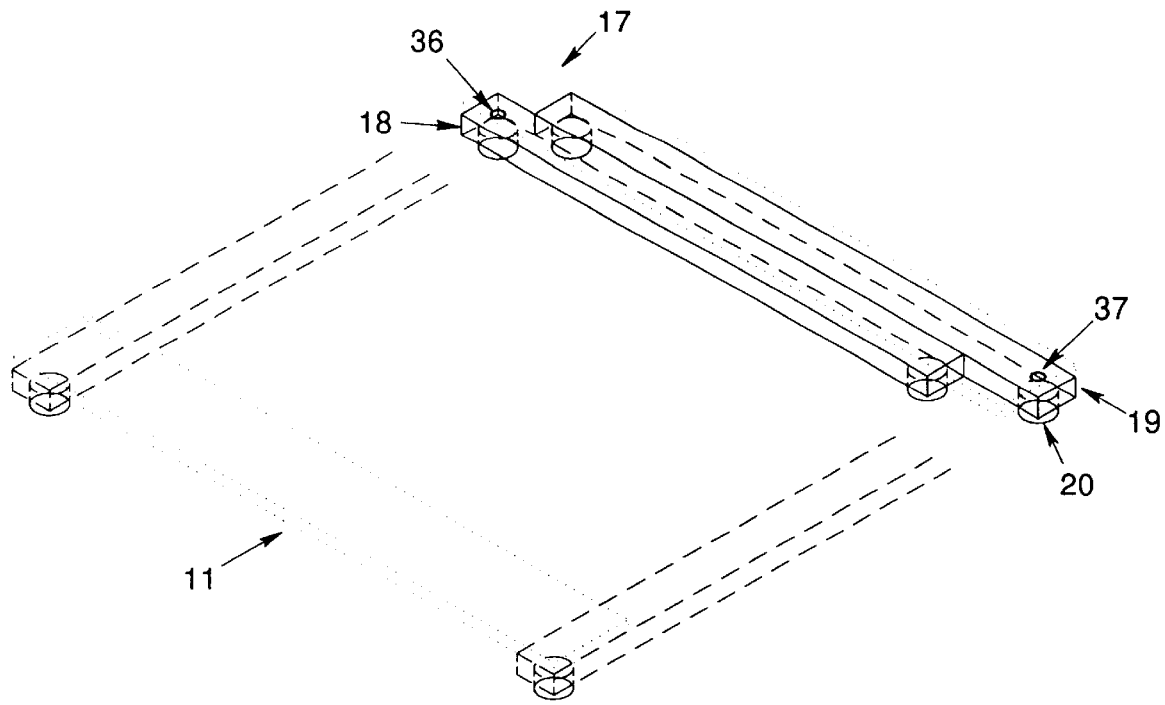
FIG. 14 is a schematic view of the relative lengths and pivot locations of a pair of support members with respect to a base segment of the scale of FIG. 1.

FIG. 14 shows the relative lengths and pivot point locations of the support members 18 and 19 with respect to the base segment 17. These lengths and pivot point locations 36 and 37 must be coordinated with the size of the segments. In this case the width of the support members shown is approximately one half the shorter dimension of the segment. When these support members pivot out, their ends must extend far enough to support the segment 11 farthest away. Pivot point 36 is closer to the end of segment 11 than pivot point 37, so that support member 18 which pivots about pivot point 36 is shorter than support member 19 which pivots about pivot point 37. Support member 19 must also be short enough to swing past support member 18.

Figure 15:
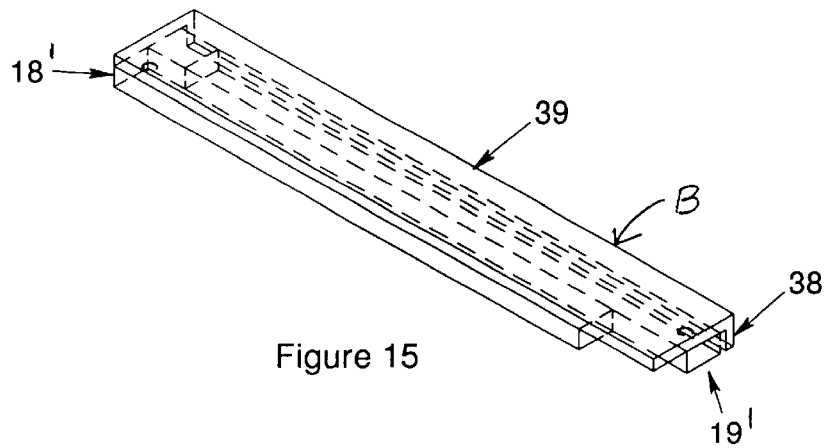
FIG. 15 is a schematic view of the use of end stops on a base segment of a scale according to a second embodiment of the present invention; in which the end stops prevent the support members from pivoting too far or the wrong way.
Figure 16:
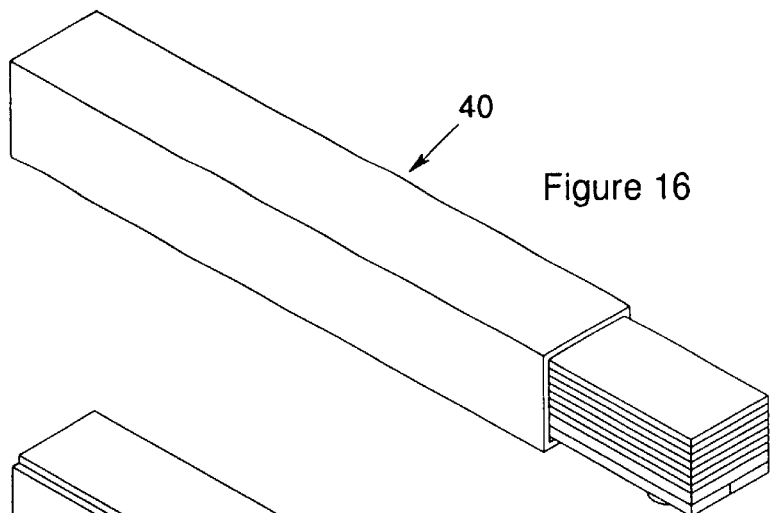
FIG. 16 is a perspective view of an enclosure that can be employed to house a closed-up form of the scale of FIG. 1.

With reference now to FIG. 15, a second embodiment of the invention is there illustrated. For ease of understanding this embodiment, like components are identified by like numerals with a primed (') suffix and new components are identified by new numerals. To prevent support members 18' and 19' from pivoting too far or the wrong way when being retracted or extended an end stop 38 can be incorporated into a base segment 39 of a scale B. An enclosure 40, as shown in FIG. 16, can be employed to house the closed-up scale to keep the platform support segments and support members from unfolding during transport.

Figure 17:
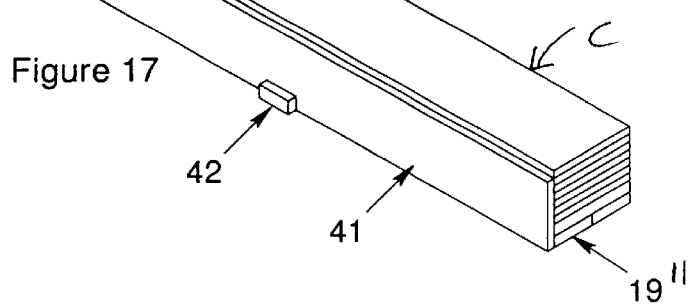
FIG. 17 is a perspective view of a button-releasable latch that can secure a closed-up scale according to a third embodiment of the present invention.

With reference now to FIG. 17, a third embodiment of the present invention is there illustrated. For ease of understanding this embodiment, like components are identified by like numerals with a double primed (") suffix and new components are identified by new numerals. In the approach depicted in FIG. 17, a scale C can have a last segment 41 which is folded in an opposite direction, covering one side of the stacked segments, and includes a button-releasable latch 42 that secures it to a support member 19". This ties the platform segments and support members together so they remain in place during transport and when stored.

Figure 18:
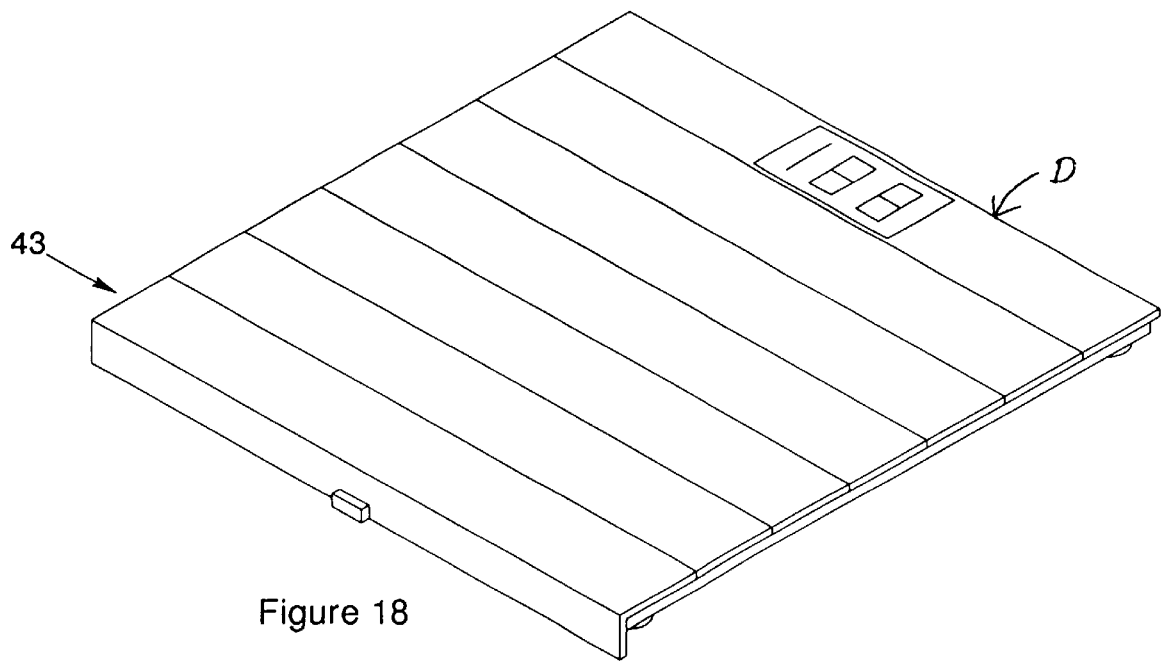
FIG. 18 is a perspective view of a deployed scale according to a fourth embodiment of the present invention when deployed.

With reference now to FIG. 18, in a fourth embodiment of the present invention, a last segment 43 of a scale D could instead be a fixed L-shaped member similar to the last two segments in FIG. 17. This L-shaped top segment 43 can then be used to latch the unit closed in the collapsed storage position illustrated in FIG. 17 but will also fit over and latch onto the ends of the segments as shown in FIG. 18. This design has the added advantage of adding significant strength to the front part of the scale when deployed due to the L-shaped last segment 43. The vertical portion of the L-shaped segment would have to be long enough to latch together the remaining platform segments but shorter than the distance from the bottom of the segments to the bottom of the sensors 20, since otherwise it would contact the floor.

Figure 19:
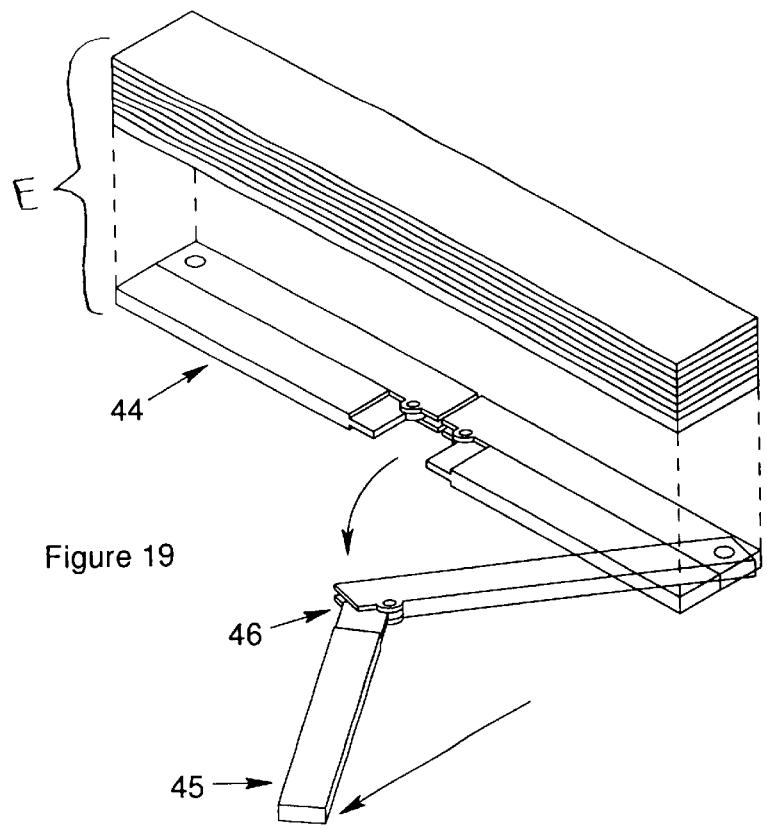
FIG. 19 is a perspective view of a collapsed scale having hinged, multi-segment support beams according to a fifth embodiment of the present invention.

With reference now to FIG. 19, a scale E according to a fifth embodiment of the present invention has support members which are composed of two folding segments 44 and 45 rather than employing two straight support members. Each support member starts folded up under the unit, and extends out to support the platform segments. In this example joint 46 is designed such that the ends of the two segments mate together to help relieve the load on the pivot. A latching mechanism can also be included to help lock them into place in either the folded or deployed positions.

Figure 20:
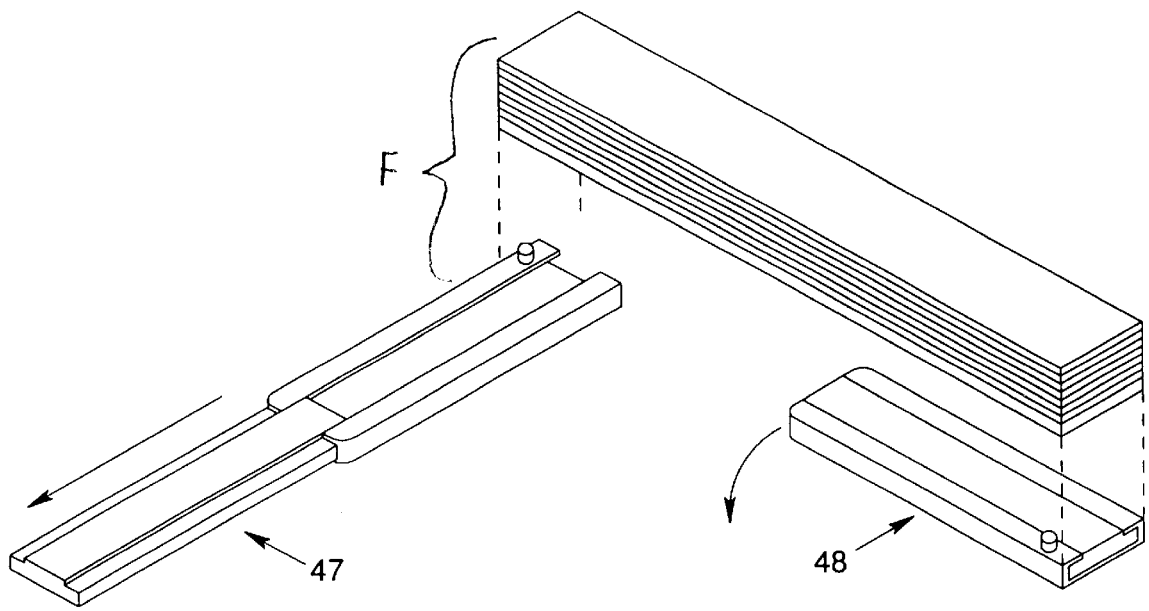
FIG. 20 is an exploded perspective view of a scale having telescoping beams according to a sixth embodiment of the present invention telescoping beams.

In yet another embodiment of the invention, as shown in FIG. 20, a scale F can have support members which are composed of two telescoping segments 47 and 48 that pivot out from underneath the unit and extend to form a continuous support for the platform segments. Like typical telescoping devices these include features to prevent the inner segment from being pulled out of the outer segment's raceway.

In a seventh embodiment of the present invention, as illustrated in FIG. 23, the platform segments and support members can be linked so that deployment occurs in a single smooth motion. FIGS. 21–24 show an embodiment wherein a scale G has platform segments 49 which are folded together vertically, and bi-fold support members 50 are linked to the extreme ends of the platform segments by way of a ball-and-socket joint 51 as depicted in FIG. 24a. These joints allow the platform support segment to fold down and the support members to rotate about them during deployment. The bi-fold support members are tapered on the ends to provide clearance during rotation until the first and last platform segments have folded down. In the example shown, the first and last platform segments are also longer than the others so that they cover and enclose the bi-fold supports when in the collapsed state. When pulled apart, they deploy together as shown in FIGS. 22 through 24. The ball-and-socket joint is but one example of the kind of known joint mechanism that can be employed to link the segments and support members.

Figure 25:
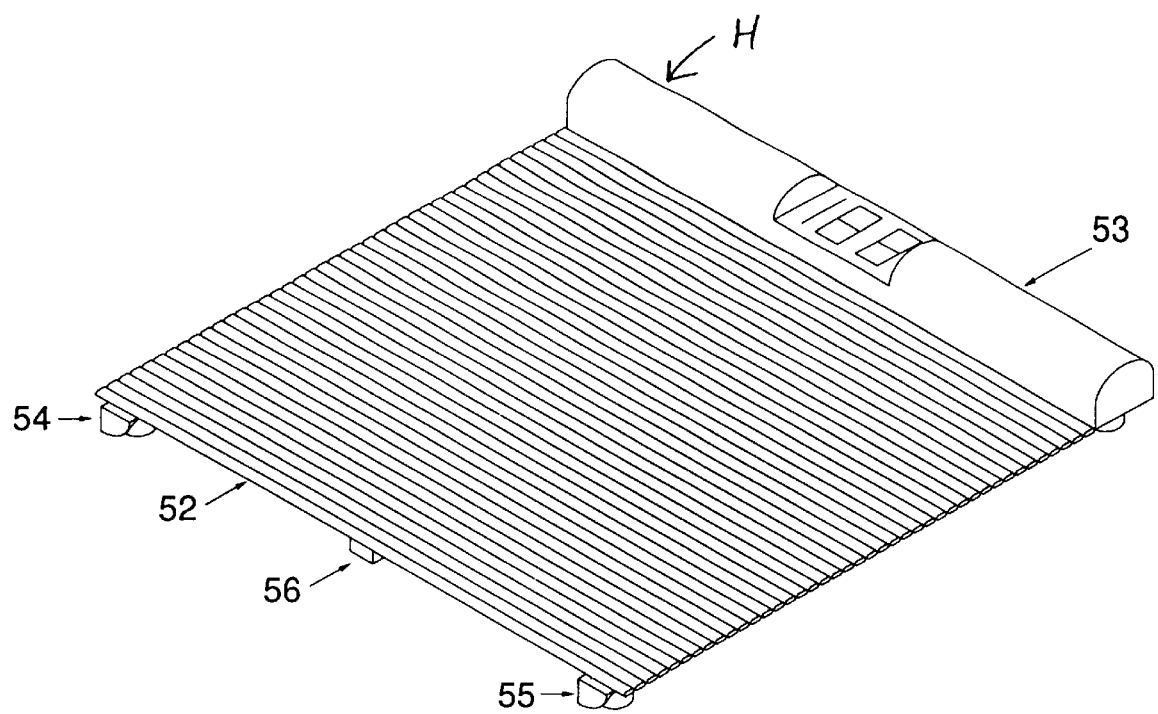
FIG. 25 is a perspective view, in a deployed configuration of a scale according to an eighth embodiment of the present invention, wherein platform segments can be rolled up around a base unit.
Figure 26:
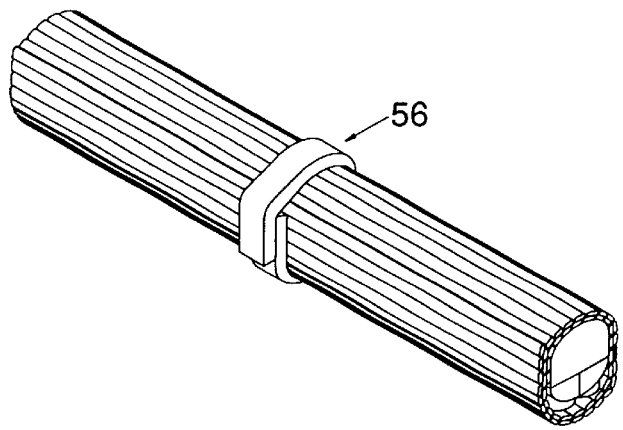
FIG. 26 is a perspective view of the scale of FIG. 25 in a storage configuration.

In an eighth embodiment of the present invention, as shown in FIG. 25, a scale H has segments composing the top platform surface which can be rolled up around the base unit. Platform segments 52 roll up around a base unit 53 after support beams 54 and 55 have rotated underneath the unit. The compacted unit is shown in FIG. 26. A reclosable strap 56 can be used to hold the unit together for storage.

The support structure must provide support for all the platform support segments, incorporate sensing elements between it and the feet that contact the ground surface to measure weight, and fold, retract, or collapse in line with the platform support segments. The composition, design, shape of the structure can be adapted to meet aesthetic or functional requirements. In particular it must be strong and robust enough to support the desired maximum weight.

Figure 27:
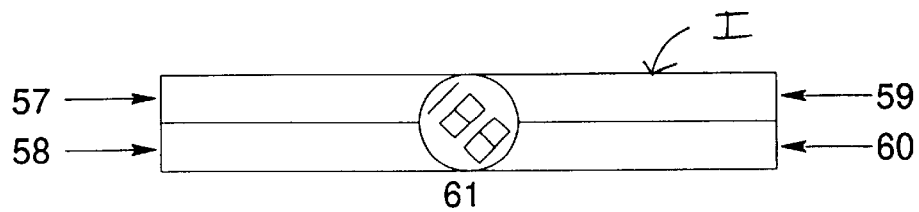
FIG. 27 is a top plan view, in a storage configuration, of a scale according to a ninth embodiment of the present invention wherein platform segments can be expanded in a fan-like arrangement.
Figure 28:
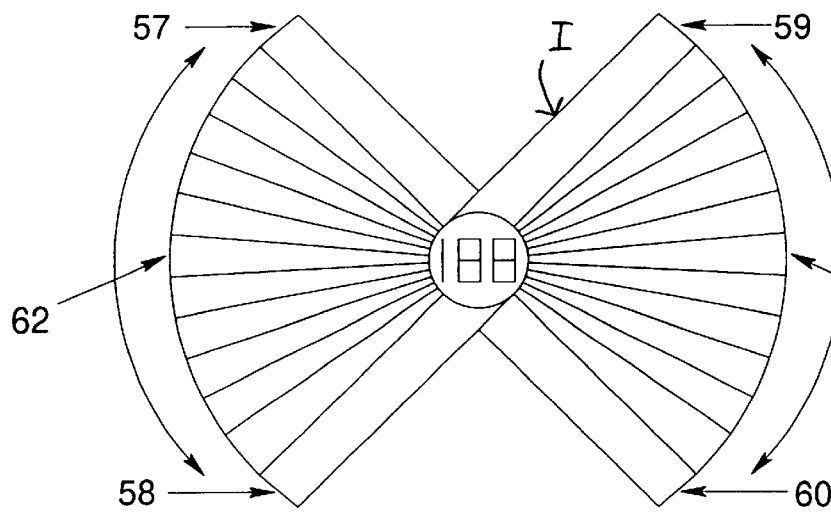
FIG. 28 is a top plan view of the scale of FIG. 27 in a deployed configuration.
Figure 29:
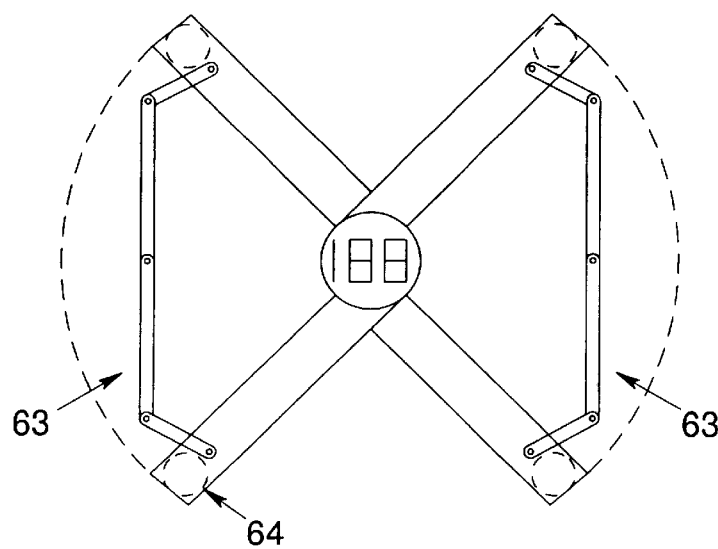
FIG. 29 is a schematic top plan view of the scale of FIG. 28 with elements omitted for clarity to illustrate support arms of the scale.

With reference now to FIG. 28, a ninth embodiment of the present invention shows a scale I having a segmented platform 62 which fans out on one or both sides of a common point. Pivoting arms 57 and 60 rotate about the central readout column 61 while arms 58 and 59 remain fixed. This reveals two fan-fold surfaces 62 stored between the fixed and pivoting arms as shown in FIG. 27 where fan-fold surfaces 62 are hidden from view. Underlying the deployed fan-fold surfaces are multi-segment support arms 63 as shown in FIG. 29 on either side of the scale that fold up in between the arms when not in use. The weight can be measured using the same techniques as mentioned in connection with the prior embodiments of the invention. In this case, the weight is measured at the four corners of the arms using sensors 64.

In a tenth embodiment of the present invention, as shown in FIG. 30, a scale J has segments 65 which can be hinged in such a way that they only fold back in one direction, and all in the same direction. It is evident from FIG. 32 that the hinges are located adjacent one face, the lower face, of the scale J. The segments can be sized such that they can then be folded up around each other into a compact form. Load sensors 66 and 67 are attached to the four corners of the platform on the inward-facing side of the folding direction. When unrolled, as depicted in FIG. 31, and placed with the sensors face down as in FIG. 32, the hinged segments will form a flat surface, since they cannot be bent further back. The segments alone provide support for the load to be measured without the need for underlying support beams. In this case the hinges and segments must be designed with greater stiffness and strength than those in prior embodiments for a given weighing capacity since the load must be borne by each segment. When in the rolled-up state, cutouts in the segment adjacent to the outermost segment with sensing feet 66 provide clearance for the load sensors with attached feet, as is evident from FIG. 32.

When folded up, either for storage or for transport, a preferred embodiment of this invention incorporates either a latching mechanism, an enclosure, or one or more reclosable straps to insure that the segments and support structure remain closed. Further, when open, the invention can incorporate a latching mechanism to remain open. It can also use various types of springs familiar to those skilled in the art of mechanical design to aid deployment, once the latch is unfastened, to hold it open in the deployed position, or to keep it closed when folded up.

In each of the embodiments described herein the load is sensed via two to four sensing devices. During use, the total weight is computed as the sum of the weights read from each of the sensors. Therefore, the load need not be uniformly distributed over the top platform surface in order to obtain an accurate reading.

Figure 33:
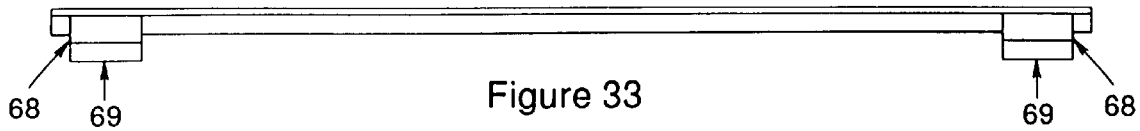
FIG. 33 is a schematic end elevational view of a scale utilizing load cells as the load sensing apparatus according to the present invention.
Figure 34:
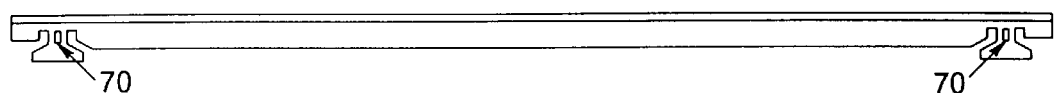
FIG. 34 is a schematic end elevational view of a scale utilizing strain gauges as the load sensing apparatus according to the present invention.

The load sensing units can be incorporated in a variety of ways. Load cells, such as model no. L1630 from Futek (Irvine, Calif.), are shown situated at each corner in FIG. 33 as element 68. Since they are only 19 mm (0.75"1) in diameter and 6.35 mm (0.25") high, the load cells are relatively small and suitable for a compact and portable scale. Attached to the bottom of the load cells are non-marring feet 69 that contact the floor surface. In another approach as shown in FIG. 34 strain gauges 70 can be attached directly onto the support structure. Here the strain gauges sense the minute displacements caused by the weight compressing the narrow columns that connect the support structure with the feet contacting the ground.

Figure 35:
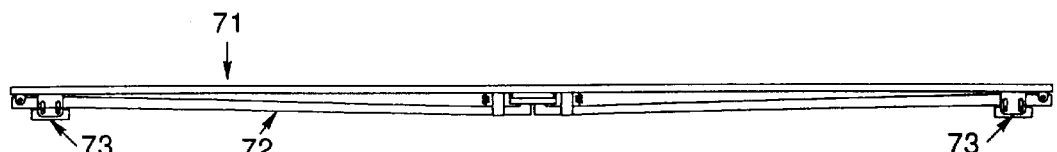
FIG. 35 is a schematic end elevational view of a scale utilizing multiple balance beams to transfer a portion of the associated weight being sensed to a single point according to the present invention.
Figure 36:
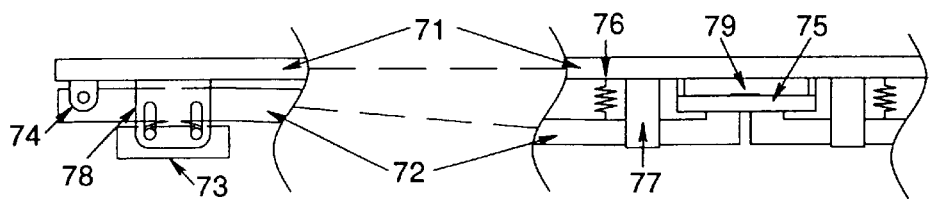
FIG. 36 is an enlarged, partially broken away end elevational view of one of the balance beams shown in FIG. 35.

In yet another approach, each support beam can be designed to transfer a fraction of the load to a single, common point such that only a single strain gauge needs be used per support beam. This type of mechanism for adding up the loads seen at each of the corners into a central measuring point is common in most scales on the market today, and is shown here to illustrate how it can be adapted for use in connection with support beams of a collapsible scale. In the design shown in FIG. 35, the load is supported by a support beam 71. With reference to FIG. 36, and continuing reference to FIG. 35, balance beams 72 transmit a percentage of the total mass (determined by the relative location of the feet 73 and pivots 74 and the length of the balance beams) to a common point at sensing device 75, here located at the center between the two ends. Springs 76 and guides 77 keep the balance beams in place. Foot brackets 78 combined with the rounded top contact point of the feet help insure that lateral forces do not interfere with the vertical component of the force measurement. Sensing device 75 consists of a metal beam incorporating single strain gauge 79, such as Futek's FR 1010 bending beam device. The output of this strain gauge would be combined with the output from the other strain gauge on the support beam supporting the other side of the scale. Any of the types of sensing units shown in FIGS. 33–36 can be used with any of the scales shown in FIGS. 1–32.

Figure 37:
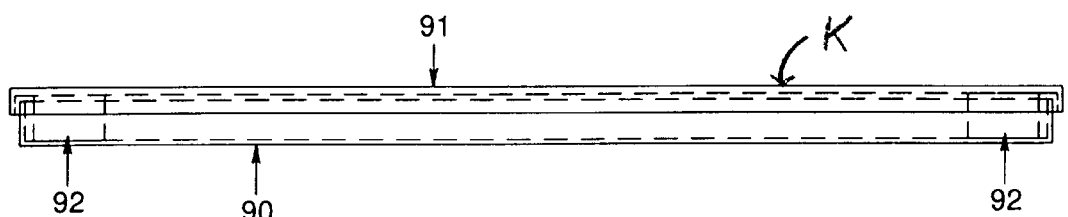
FIG. 37 is a schematic side elevational view of a scale wherein a support member comprises two box-like frames with load sensors joining the box-like frames according to an eleventh embodiment of the present invention.

FIG. 37 shows an eleventh embodiment of the present invention. In this embodiment, a scale K has a support member composed of two box-like frames. These comprise a bottom frame 90 that rests on the floor and separate top frame 91 which bears the load from the top surface segments. Load sensors 92 join the top and bottom halves. This design provides a more enclosed structure to help protect the sensors and wiring and provide a clean appearance to the outside of the collapsed scale.

Figure 38:
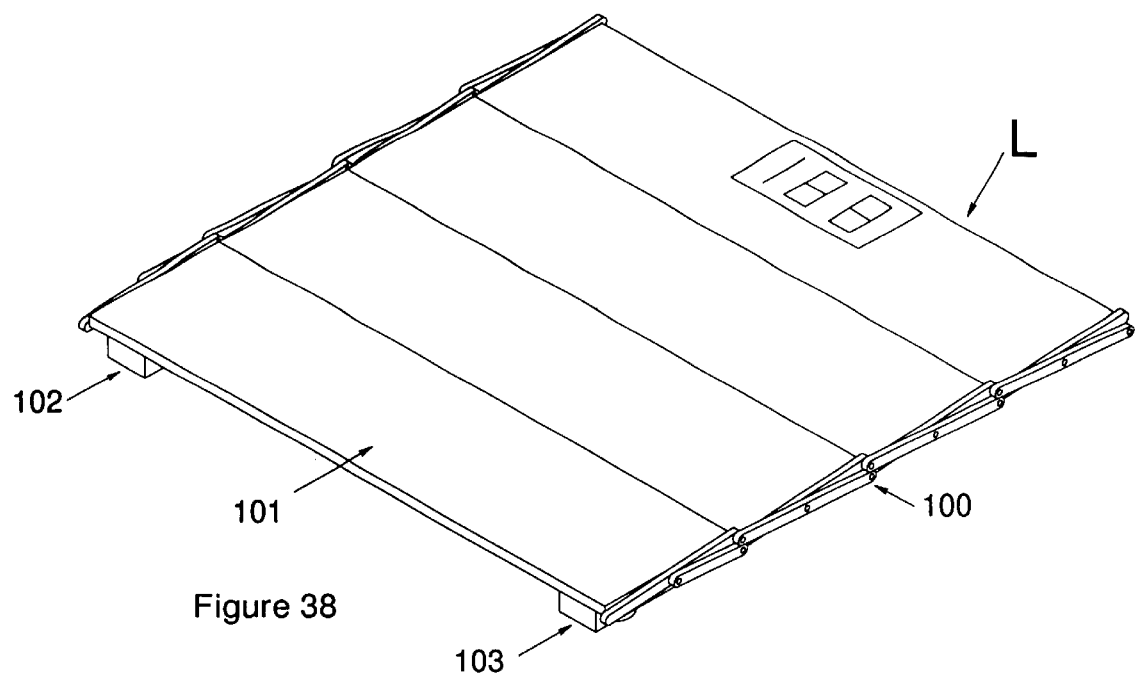
FIG. 38 is a perspective view of a collapsible scale using a scissor-type mechanical linkage to tie together the platform segments according to a twelfth embodiment of the present invention.
Figure 39:
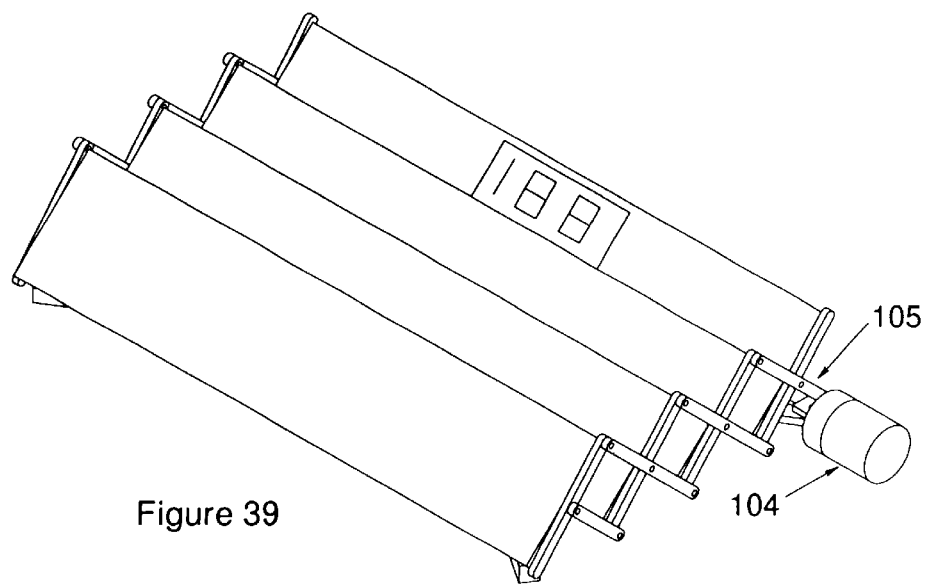
FIG. 39 is a perspective view showing an intermediate stage of deployment or retraction of the scale of FIG. 38.
Figure 40:
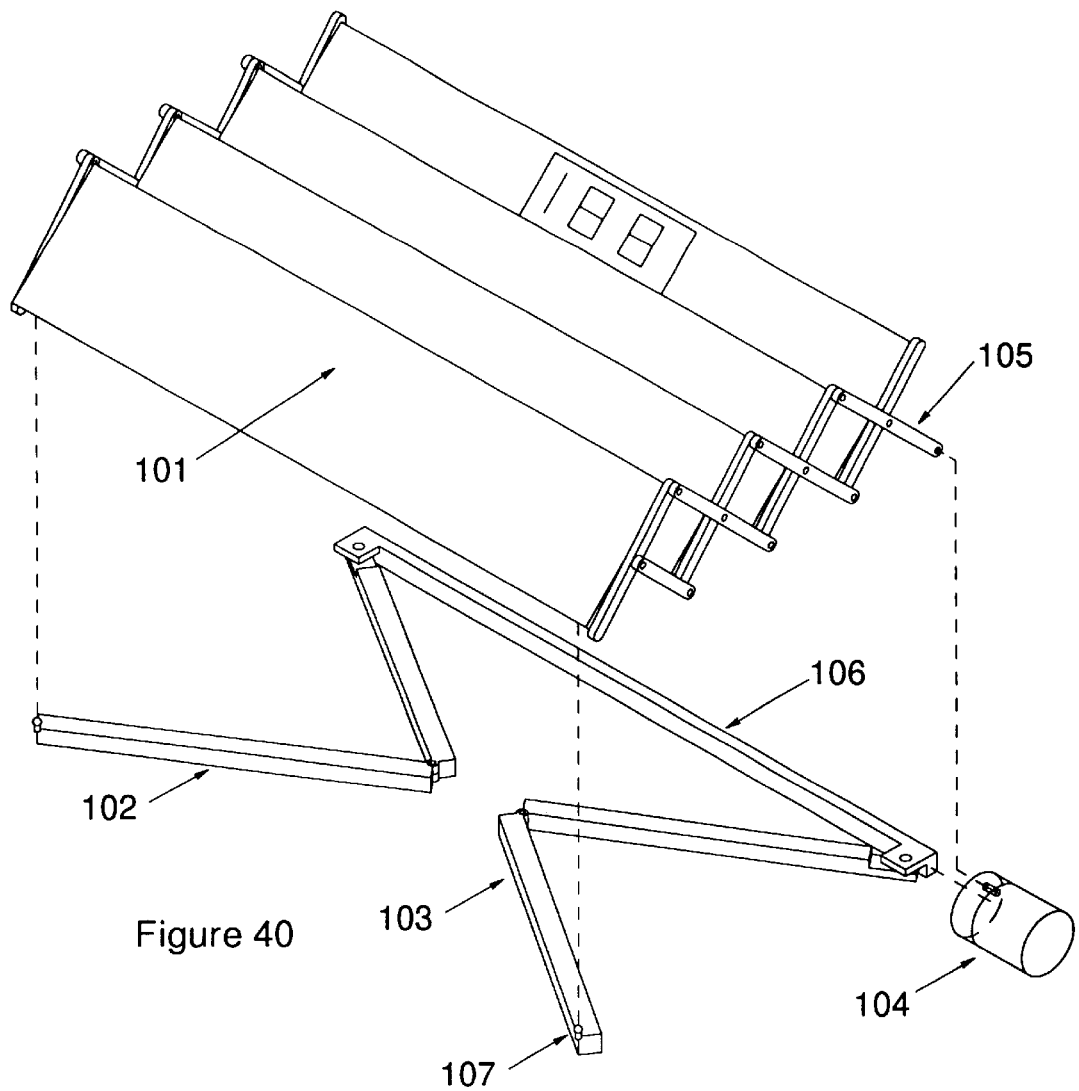
FIG. 40 is an exploded perspective view of the major components of the scale of FIG. 38; and, FIG. 41 is a perspective view of the scale of FIG. 38 in a fully collapsed position.

FIG. 38 shows a twelfth embodiment of the present invention in its fully deployed configuration. This embodiment shows a scale L which features a scissor-type joint mechanism wherein linkage elements 100 tie together the separate platform segments 101. FIG. 39 shows an intermediate stage of deployment or retraction. An actuator 104, attached near the rear of the platform, may be employed to rotate the linkage arm 105 and provide automatic deployment and/or retraction motion. The actuator attaches to frame 106 as shown in the exploded view of FIG. 40, to which the pivoting support members 102 and 103 also attach. The opposite end of the scale is linked to the end of support members 102 and 103 by joint 107 in a way that permits rotation about that point. Thus, a rotating motion of linkage 105 causes all the segments 101 to deploy into a plane and collapse into a stack while support members 102 and 103 extend to support the segments and retract to fold up underneath the unit as shown in FIG. 41.

Figure 41:
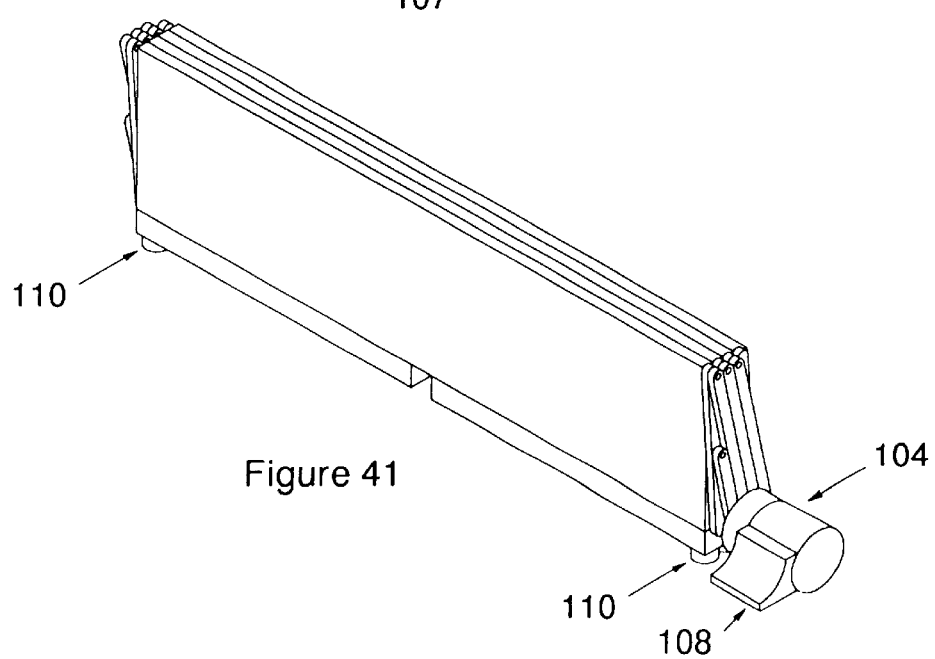

The actuator 104 in FIG. 41 could consist of a geared electric motor to provide controlled deployment and retraction when a push-button switch or other triggering means such as 108 is depressed. Rather than driving link 105, the actuator may alternately drive one or both of the support members which would deploy and retract the platform segments. The scale could also automatically retract after a certain amount of time has elapsed since the last use. The bottom surfaces of the two rear feet should consist of a rubber-like material in order to minimize movement of the scale at the back, while the bottom surfaces of the two front feet 110 should be virtually frictionless in order to facilitate sliding on any surface.

For an actuator, the scale may alternately employ a passive spring (such as a coiled spring or gas spring) and latch mechanism that, when triggered by a lever accessible to the front of the unit such as 108 in FIG. 41, releases the spring and deploys the scale for use. For retraction, pushing on the front of the unit towards the rear will reverse this action, collapsing the unit and recoiling the spring until the unit latches closed. Support members 102 and 103 should be designed accordingly to facilitate this. Specifically, they must be designed either to avoid locking into position when the scale is in its deployed configuration, or be designed with an unlatching mechanism, possibly using levers protruding from the fronts of the supports as they appear in FIG. 38.

The invention has been described with reference to numerous preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A collapsible weighing scale comprising:
   a platform comprising a plurality of interconnected support segments which are arranged such that the support segments can be alternately collapsed into a storage configuration and deployed into a use configuration in which said plurality of support segments lie side to side in a common plane;
   a plurality of hinges wherein adjacent support segments are interconnected by at least one of said hinges;
   a supporting structure connected to the platform wherein the platform, when fully deployed, rests on the supporting structure and wherein the supporting structure can be collapsed;
   a load sensing apparatus attached to the supporting structure wherein the load sensing apparatus senses the full weight of an associated object which is placed on the fully deployed platform supported by the fully deployed supporting structure; and,
   a display, connected to said load sensing apparatus, that converts the weight sensed by the load sensing apparatus to a human readable form.

2. The collapsible weighing scale of claim 1 wherein the support segments of said platform are hinged to each other on each lateral side.

3. The collapsible weighing scale of claim 1 wherein the support segments of said platform are approximately rectangular in shape having long and short edges and wherein the support segments are connected along their long edges.

4. The collapsible weighing scale of claim 1 wherein the platform and supporting structure are linked together so that both are deployed simultaneously and collapsed simultaneously.

5. A collapsible weighing scale comprising:
   a platform comprising a plurality of interconnected support segments which are arranged such that the support segments can be alternately collapsed into a storage configuration and deployed into a use configuration in which said plurality of support segments lie side to side in a common plane;

a supporting structure connected to the platform wherein the platform, when fully deployed, rests on the supporting structure and wherein the supporting structure can be collapsed and wherein the platform and supporting structure are linked together so that both are deployed simultaneously and collapsed simultaneously;

an actuator for moving said platform and said supporting structure between the platform and support structure use and platform and support structure storage configurations;

a load sensing apparatus attached to the supporting structure wherein the load sensing apparatus senses the full weight of an associated object which is placed on the fully deployed platform supported by the fully deployed supporting structure; and, a display, connected to said load sensing apparatus, that converts the weight sensed by the load sensing apparatus to a human readable form.

6. The collapsible weighing scale of claim 1 further comprising a latch located on at least one of said plurality of support segments for latching onto the supporting structure when both the platform and the supporting structure are deployed.

7. A collapsible weighing scale comprising:

a platform comprising a plurality of connected support segments arranged such that the support segments can be alternately collapsed into a platform storage configuration and deployed into a platform use configuration in which said plurality of support segments lie side by side in a common plane;

a plurality of hinges wherein side by side support segments are connected to each other by at least one of said hinges;

a supporting structure comprising two beams connected to the platform wherein the platform, when fully deployed, rests on the two beams when they are deployed into a beam use configuration and wherein, when the platform is fully collapsed, the two beams can be folded into a beam storage configuration;

a load sensing apparatus attached to the support structure wherein the load sensing apparatus senses the full weight of an associated object when placed on the fully deployed platform supported by the fully deployed supporting structure; and, a display, connected to said load sensing apparatus, that converts the weight sensed by the load sensing apparatus to a human readable form.

8. The collapsible weighing scale of claim 7 wherein the two beams each comprise rigid members pivotally mounted to the platform and wherein the rigid members can be inward when being placed in the beam storage configuration.

9. The collapsible weighing scale of claim 7 wherein the two beams each comprise hinged multi-segment beams which can be folded to a compact form when being placed in the beam storage configuration.

10. The collapsible weighing scale of claim 7 wherein the two beams comprise telescoping support members.

11. The collapsible weighing scale of claim 7 wherein said two beams are located on opposed lateral sides of said platform when said platform and said support structure are, respectively, in the platform use configuration and the beam use configuration.

12. The collapsible weighing scale of claim 7 wherein the load sensing apparatus is located on at least one of said two beams.

13. The collapsible weighing scale of claim 7 wherein the load sensing apparatus comprises at least one of load cells, strain gauges and balance beams.

14. The collapsible weighing scale of claim 13 wherein the load sensing apparatus comprises four load sensing elements which are located, respectively, at opposed ends of each of said two beams.

15. The collapsible weighing scale of claim 14 further comprising two bottom frame members located, respectively, beneath each of said two beams such that two load sensing elements, which are disposed beneath each of said two beams, are positioned adjacent a surface of a respective one of said two bottom frames.

16. A collapsible weighing scale comprising:

a platform comprising a plurality of connected support segments arranged such that the support segments can be alternately collapsed into a platform storage configuration and deployed into a platform use configuration in which said plurality of support segments lie side by side in a common plane;

a supporting structure comprising two beams connected to the platform wherein the platform, when fully deployed, rests on the two beams when they are deployed into a beam use configuration and wherein, when the platform is fully collapsed, the two beams can be folded into a beam storage configuration;

an actuator for moving said platform and said supporting structure between the platform and beam use configurations and the platform and beam storage configurations;

a load sensing apparatus attached to the support structure wherein the load sensing apparatus senses the full weight of an associated object when placed on the fully deployed platform supported by the fully deployed supporting structure; and, a display, connected to said load sensing apparatus, that converts the weight sensed by the load sensing apparatus to a human readable form.

17. The collapsible weighing scale of claim 7 further comprising a latch for securing said platform and said supporting structure in a collapsed condition.

18. A collapsible weighing scale comprising:

a platform comprising a plurality of support segments that are attached together at at least one pivot point wherein said plurality of support segments can be deployed fan-like from a collapsed configuration into a use configuration to form a substantially flat surface in which said plurality of support segments lie substantially in a common plane;

a load sensing apparatus attached to at least one of the support segments wherein the load sensing apparatus senses the full weight of an associated object when placed on the fully deployed platform;

a supporting structure connected to at least two of the plurality of support segments of said platform wherein the supporting structure supports the remaining support segments of said platform when the plurality of support segments are deployed into the use configuration; and, a display, connected to said load sensing apparatus, that converts the weight sensed by the load sensing apparatus to a human readable form.

19. The collapsible weighing scale of claim 18 wherein at least one support segment is fixed with respect to the display and the remaining support segments deploy and collapse in a fan-like arrangement.

20. The collapsible weighing scale of claim 18 wherein the supporting structure comprises multi-segment arms that fold up when not in use.

* * * * *